United States Patent [19]

Boguslavsky et al.

[11] Patent Number: 5,962,171
[45] Date of Patent: Oct. 5, 1999

[54] COMPOSITION USEFUL IN ELECTROLYTES OF SECONDARY BATTERY CELLS

[75] Inventors: Leonid I. Boguslavsky; Yuriy V. Mikhaylik; Alexei B. Gavrilov; Terje A. Skotheim, all of Tucson, Ariz.

[73] Assignee: Moltech Corporation, Tucson, Ariz.

[21] Appl. No.: 08/995,370

[22] Filed: Nov. 26, 1997

Related U.S. Application Data

[63] Continuation of application No. 08/664,110, Jun. 14, 1996, abandoned.

[51] Int. Cl.$^6$ .................................................. H01M 10/40
[52] U.S. Cl. .......................... 429/325; 429/303; 429/306; 429/218.1
[58] Field of Search .................................. 429/190, 191, 429/192, 199, 195, 198, 218, 325, 218.1, 303, 306

[56] References Cited

U.S. PATENT DOCUMENTS

| | | |
|---|---|---|
| 3,532,543 | 10/1970 | Nole et al. . |
| 3,806,369 | 4/1974 | Dey et al. . |
| 3,907,591 | 9/1975 | Lauck . |
| 3,993,503 | 11/1976 | Ludwig . |
| 4,303,748 | 12/1981 | Armand et al. . |
| 4,410,609 | 10/1983 | Peled et al. . |
| 4,833,048 | 5/1989 | De Jonghe et al. . |
| 4,844,996 | 7/1989 | Peled et al. ............................ 429/194 |
| 4,917,974 | 4/1990 | De Jonghe et al. . |
| 5,296,319 | 3/1994 | Bito et al. . |
| 5,413,881 | 5/1995 | Licht et al. . |
| 5,432,425 | 7/1995 | Lundquist et al. . |
| 5,436,549 | 7/1995 | Lundquist et al. . |
| 5,437,944 | 8/1995 | Kita et al. ................................ 429/195 |
| 5,441,831 | 8/1995 | Okamoto et al. . |
| 5,460,905 | 10/1995 | Skotheim . |
| 5,462,566 | 10/1995 | Skotheim . |
| 5,487,959 | 1/1996 | Koksbang . |
| 5,506,072 | 4/1996 | Griffin et al. ........................... 429/188 |
| 5,523,179 | 6/1996 | Chu . |
| 5,529,860 | 6/1996 | Skotheim et al. . |
| 5,532,077 | 7/1996 | Chu ......................................... 429/102 |
| 5,601,947 | 2/1997 | Skotheim et al. . |

FOREIGN PATENT DOCUMENTS

| | | |
|---|---|---|
| 602984 A2 | 6/1994 | European Pat. Off. . |
| 2084391 | 4/1982 | United Kingdom . |

OTHER PUBLICATIONS

Abstract for Japanese Patent Publication No. JP 08–138742, published May 31, 1996, for Japanese Patent Application No. JP 06–269344 filed Nov. 2, 1994 (Patent Abstracts of Japan, 1 page).

(List continued on next page.)

*Primary Examiner*—Stephen Kalafut
*Attorney, Agent, or Firm*—Morrison & Foerster LLP

[57] ABSTRACT

Provided is a nonaqueous electrolyte element for use in secondary battery cells which comprises an effective lithium stripping enhancing amount of one or more soluble materials, such as a lithium polysulfide, which increases the lithium stripping efficiency. Also provided is a secondary lithium battery cell comprising said nonaqueous electrolyte element. Such a nonaqueous electrolyte element can be advantageously used in the manufacture of secondary electric-current producing cell elements, and provides many advantages in achieving extended cycle life and increased safety of secondary lithium batteries.

26 Claims, 6 Drawing Sheets

OTHER PUBLICATIONS

Abstract for Japanese Patent Publication No. JP 62–037877, published Feb. 18, 1987, for Japanese Patent Application No. JP 60–176547 filed Aug. 10, 1985 (Patent Abstracts of Japan, 1 page).

Besenhard et al., "Inorganic film–forming electrolyte additives improving the cycling behaviour of metallic lithium electrodes and the self–dischage of carbon–lithium electrodes" *J. Power Sources* (1993) 43–44:413–420 (month N/A).

Liu et al., "Novel solid redox polymerization electrodes" *J. Electrochem. Soc.* (1991) 138:1891–1895 (month N/A).

Peled et al., "Lithium–sulfur battery: Evaluation of dioxolane–based electrolytes" *J. Electrochem. Soc.* (1989) 136:1621–1625 (month N/A).

Peled et al., "Rechargeable lithium–sulfur battery (extended abstract)" *J. Power Sources* (1989) 26:269–271 (month N/A).

Rauh et al., "A lithium/dissolved sulfur battery with an organic electrolyte" *J. Electrochem. Soc.* (1979) 12:523–527 (month N/A).

Rauh et al., "Efficiencies of cycling lithium on a lithium substrate in propylene carbonate" *J. Electrochem. Soc.* (1978) 125:186–190 (month N/A).

Yamin et al., "Eletrochemistry of a nonaqueous lithium/sulfur cell" *J. Power Sources* (1983) 9:281–287 (month N/A).

Yamin et al., "Lithium sulfur battery" *J. Electrochem. Soc.* (1988) 135:1045–1048 (month N/A).

FIG. 1

Water content, ppm, in TEGME/1M lithium imide solution

Lithium octasulfide (Li$_2$S$_8$) concentration (M) in TEGDME:
1,3-dioxolane (1:1)/1M lithium triflate solution with
14 ppm of water present

Water Content, ppm, in TEGDME/1M lithium imide solution

COMPOSITION USEFUL IN ELECTROLYTES OF SECONDARY BATTERY CELLS

This application is a continuation of application Ser. No. 08/664,110, filed Jun. 14, 1996, now abandoned.

BACKGROUND OF THE INVENTION

1. Field of the Invention

The present invention relates generally to nonaqueous electrolyte elements for use in secondary electric current-producing cells, and to rechargeable lithium electric current-producing cells employing a nonaqueous electrolyte element comprising a soluble electrolyte additive that increases the lithium stripping efficiency at the anode-electrolyte interface.

2. Prior Art

As the rapid evolution of batteries continues, and particularly as lithium-ion and lithium metal batteries become more widely accepted for a variety of uses, the need for safe, long lasting rechargeable batteries becomes increasingly important. There has been considerable interest in recent years in developing high energy secondary batteries comprising an electrolyte element which improves the cycle life and safety of the battery. U.S. Pat. Nos. 5,460,905 and 5,462,566 by applicant, the disclosures of both of which are totally incorporated herein by reference, describe the basic elements and performance requirements of secondary lithium batteries and their components.

The production of unitary electrolyte elements which are particularly useful in electrochemical cells of many different types in general, have been extensively described in patents and other literature. Some of these electrolyte elements have multilayer structures and are prepared by various means of adding an additional electrolyte layer between a first electrolyte layer and one or both of the electrodes. Alternatively, if desired, a barrier or stabilization layer may be imposed between the electrolyte element and one or both of the electrodes, such as described in U.S. Pat. No. 5,487,959 to Koksbang.

One of the many problems encountered in the process of producing electrolyte elements, and particularly those useful in electrochemical cells with lithium as the negative electrode or anode, is that there is a difficulty in obtaining good efficiency, cycling life, and safety of the cells due to reactivity of the electrolyte element with the electrode elements, particularly due to reactions with the anode. There is further difficulty in obtaining good efficiency, cycling life, and safety of the cells due to the diffusion of materials from other layers of the cell, particularly discharge products from the positive electrode or cathode layer, into the electrolyte element. These materials that have diffused into the electrolyte element can react in a detrimental way with the anode or another layer in contact with the electrolyte element, or can react directly with the electrolyte element.

The foregoing disadvantages for producing electrolyte elements for electrochemical cells are even more problematic when the cathode layer utilizes a sulfur-based active material in combination with a lithium-based anode. For instance, in U.S. Pat. No. 3,907,591, Lauck describes the reduction of the elemental sulfur active material during the discharging of the cell to produce soluble lithium polysulfides at high concentrations. This leads to reduced efficiency and cycling life of the cells due to formation of insoluble lithium sulfides, such as lithium sulfide ($Li_2S$), which deposit on the cathode and clog its pores to block interaction with the electrolyte, as well as due to undesirable reactions of the soluble lithium polysulfides with the lithium-based anode.

Lithium and sulfur are highly desirable as the active materials for the anode and cathode, respectively, of rechargeable or secondary battery cells because they have the highest energy density on a weight or volume basis of any of the known combinations of active materials. To obtain high energy densities, the lithium can be present as the pure metal or in an alloy or in an intercalated form, and the sulfur can be present as elemental sulfur or as an organic material with a high sulfur content, preferably greater than 50 weight per cent sulfur. The aforementioned disadvantages of the high reactivity of lithium with the electrolyte element and the transport of excessive amounts of soluble and insoluble polysulfides from the cathode layer into the electrolyte element in combination cause a complex number of chemical reactions which in total reduce the cycle life and safety of the cells.

To overcome the foregoing disadvantages for producing electrolyte elements, and in particular for producing electrochemical cell elements with a lithium-based anode, in U.S. Pat. No. 4,303,748 to Armand, et al., the disclosures of which are totally incorporated herein by reference, the electrolyte element is a solid polymer electrolyte (SPE). This SPE is less reactive with the lithium-based anode than liquid electrolytes and, optionally, an ionically conductive polymer, the same as or similar to that in the SPE, is further incorporated into the cathode composite layer containing, for example, elemental sulfur and conductive carbon. The ionically conductive polymer is incorporated into this elemental sulfur and conductive carbon coating at levels of up to 25 weight per cent to improve the electrochemical performance and the mechanical integrity of the coating. In spite of the lower reactivity of the electrolyte element and the binding strength and ionic conductivity of the polymer, such as polyethylene oxide (PEO), in the composite cathode, there remains excessive diffusion of soluble lithium polysulfides from the cathode into the electrolyte element and into contact with the lithium anode which severely reduces the cycle life and safety of the cell.

In U.S. Pat. No. 5,523,179, the disclosures of which are totally incorporated herein by reference, Chu describes some of the prior art on elemental sulfur cathode/lithium anode battery cells, including the formation and detrimental action of polysulfides with nonaqueous electrolytes. No information is provided on the use of additives in the electrolyte element to increase cycle life and safety.

U.S. Pat. Nos. 4,833,048 and 4,917,974 to De Jonghe, et al., disclose a class of sulfur-based cathode materials made of organosulfur compounds of the formula $(R(S)_y)_n$ where $y=1$ to 6; $n=2$ to 20, and R is one or more different aliphatic or aromatic organic moieties having one to twenty carbon atoms. The preferred form of the cathode material is a simple dimer or $(RS)_2$. Herein, by the term "organosulfur composition" is meant a composition containing organic sulfur compounds with only single or double carbon-sulfur bonds or sulfur-sulfur bonds forming disulfide linkages, and typically with more than 3 per cent by weight of non-sulfur or non-carbon elements. The organosulfur materials investigated by De Jonghe, et al., undergo polymerization (dimerization) and de-polymerization (disulfide cleavage) upon the formation and breaking of the disulfide bonds. The de-polymerization which occurs during the discharging of the cell results in lower molecular weight polymeric and monomeric species, namely soluble anionic organic sulfides, which can dissolve into the electrolyte and cause self-discharge as well as reduced capacity, thereby severely reducing the utility of the organosulfur material as a cathode-active material and eventually leading to complete cell failure. The result is an unsatisfactory cycle life having a maximum of about 200 deep discharge-charge cycles, more typically less than 100 cycles as described in *J. Electrochem. Soc.*, Vol. 138, pp. 1891–1895 (1991). Although the soluble discharge products are soluble sulfides rather than the polysulfides of the type formed with elemental sulfur, the detrimental effects on efficiency and cycle life are similar. In addition, the organosulfur materials typically contain less than 50 weight per cent of sulfur so they have correspondingly a much lower energy density than elemental sulfur.

U.S. Pat. No. 5,441,831 and U.S. patent application Ser. No. 08/478,330 now U.S. Pat. No. 5,601,947 by applicant, the disclosures of which are totally incorporated herein by reference, disclose carbon-sulfur polymers of the general formula I $$—(CS_x)_n—\qquad\qquad I$$

wherein x takes values of 1.2 and greater and n is an integer equal to or greater than 2. Herein, by the term "carbon-sulfur polymer composition" is meant a composition containing carbon-sulfur polymers with carbon-sulfur single and double bonds, with sulfur-sulfur bonds forming disulfide, trisulfide, and higher polysulfide linkages, and typically with less than 3 per cent by weight of non-sulfur or non-carbon elements. Further useful carbon-sulfur cathode active polymers are compositions of general formula II, $$—(C_2S_z)_n—\qquad\qquad II$$

wherein z ranges from greater than 1 to about 100, and n is equal to or greater than 2, as described in U.S. patent application Ser. Nos. 08/477,106 now U.S. Pat. No. 5,529,860 and 08/602,323 by applicant, the disclosures of which are totally incorporated herein by reference. With these carbon-sulfur cathode active compositions, organic polysulfides are formed during discharge. Polysulfides are meant to indicate sulfides with two or more sulfur atoms bonded together. Thus, the disulfides of the organosulfur compositions described heretofore form monosulfides or sulfides [RS$^-$] during reduction or discharge. Since the carbon-sulfur polymer compositions of I and II contain large amounts of [—S$_m$—] groups where m is 3 or greater, they form organic polysulfides [R'S$_x^-$], where x is 2 or greater and R' is the carbon-sulfur moiety to which the polysulfide group is attached, during reduction or discharge. Some of these organic polysulfides are insoluble because of their attachment to the polymer backbone, but upon continued discharge, they progressively are further reduced to soluble organic polysulfides, and still further to soluble inorganic polysulfides [S$_x^{2-}$], where x is 2 or greater. Thus, with the carbon-sulfur polymer compositions, some of the discharge products are the same polysulfides formed in the discharge of cathodes containing elemental sulfur.

Even though the carbon-sulfur polymer compositions show improvements over organosulfur compositions as cathode active materials because of lower amounts of soluble sulfides and because of a higher energy density from the typically higher weight per cent of sulfur of over 50 per cent, and preferably above 85 per cent, there is still some formation of soluble organic polysulfides, as well as inorganic polysulfides as also formed in the discharge of elemental sulfur cathode active compositions.

Several approaches have been described to inhibit or retard the transport or diffusion of soluble polysulfides from the cathode to the electrolyte element. U.S. Pat. No. 3,806,369 to Dey, et al., describes an ion exchange membrane between the cathode and the electrolyte/separator layer to inhibit the passage of polysulfides or other anions from the cathode into the electrolyte element. Without this barrier layer, the soluble polysulfides or other anions form insoluble films on the cathode and shorten the cycle life of the cell. U.S. Pat. No. 3,532,543 to Nole, et al., describes the largely unsuccessful attempt to use copper halide salts to limit the formation of polysulfides in an elemental sulfur cathode.

In a provisional U.S. patent application, filed on May 22, 1996, by applicant, the disclosures of which are totally incorporated herein by reference, there is disclosed the addition of a class of materials to the sulfur-based cathode active material to encapsulate or entrap the sulfur-based material to effectively retard the transport of soluble polysulfides and sulfides from the cathode into the electrolyte element.

Barrier layers such as those described heretofore can be effective in preventing excessive diffusion of soluble cathode reduction products, such as inorganic polysulfides, into the electrolyte element, thereby improving cycle life and safety from the levels obtained when excessive inorganic polysulfides and other soluble cathode reduction products are present in the electrolyte element. However, these barrier layers have disadvantages, besides the cost and the non-cathode active volume occupied by the materials, in that they may so effectively block the transport of soluble anionic species into the electrolyte element that low, but not excessive, concentrations of the soluble anions that would have some beneficial effects in the electrolyte element are not obtained. Also, the barrier may be only partially effective so that there is a slow buildup of soluble cathode reduction products in the electrolyte, at first at too low concentrations to be beneficial in the early cycles of the cell which can be a particularly critical time period for the ultimate cycle life and safety of the cell. In the later charge-discharge cycles of the cell, the concentrations of the soluble polysulfide and other anions can become too high or excessive, thereby shortening the cycle life and decreasing the safety. Lastly, these barriers are typically indiscriminate in that they do not selectively allow passage of one soluble anion which is acceptable or desired in the electrolyte element while blocking the passage of another soluble anion which is not acceptable or desired in the electrolyte element.

There have been several types of battery cells which incorporate polysulfides in the electrolyte or the cathode. One type is the sodium-sulfur battery cell, such as described in U.S. Pat. No. 3,993,503 to Ludwig, the disclosures of which are totally incorporated herein by reference, which involves liquid sodium anodes and liquid cathodes with a solid electrolyte and with operation at elevated temperatures, well above room temperature, where the anode and cathode materials are in a molten state. Another type is the aqueous lithium-sulfur cell where the polysulfide is in an aqueous electrolyte, as described in U.S. Pat. No. 5,413,881 to Licht, et al., the disclosures of which are totally incorporated herein by reference. Both these types have electrochemical properties, operating conditions, and materials markedly distinct from the solid lithium metal/non-aqueous electrolyte/non-liquid cathodes of the secondary cells of the present invention.

There has been some mention of the beneficial effects of inorganic polysulfides in primary cells of the general solid lithium/non-aqueous electrolyte/elemental sulfur non-liquid cathode type. U.S. Pat. No. 4,410,609 to E. Peled, et al., the disclosures of which are totally incorporated herein by reference, describes the use of greater than 0.01M polysulfide in the electrolyte of a primary lithium-elemental sulfur cell in combination with greater than a 0.1 M concentration of a lithium salt to form an insoluble $Li_2S$ solid electrolyte interphase or film on the anode material. Since it is directed to a primary cell only, no information is provided on electrolytes for use in rechargeable secondary lithium cells where additional requirements, such as improving the cycle life and safety, are particularly important.

More research on the addition of polysulfides to form a passivation film on lithium anodes is described in *J. Electrochem. Soc.,* Vol. 135, pp. 1045 to 1048 (1988) by Yamin, et al., and in *J. Electrochem. Soc.,* Vol. 136, pp. 1621 to 1625 (1989) by Peled, et al., and references therein, the disclosures of all of which are totally incorporated herein by reference.

For secondary cells of the solid lithium/non-aqueous electrolyte/non-liquid cathode type, E. Peled, et al., in *J. Power Sources,* Vol. 26, pp. 269 to 271 (1989), the disclosures of which are totally incorporated herein by reference, describes the presence of lithium polysulfide at a 0.1 M concentration in an electrolyte, but reported extremely low capacities and cycle life.

Besenhard, et al., in *J. Power Sources,* Vol. 43–44, pp. 413 to 420 (1993), the disclosures of which are totally incorporated herein by reference, describes a twofold decrease in cycle capacity loss for just the first two cycles with a lithium intercalated carbon anode and various inorganic additives, including a very low 0.0003M polysulfide concentration. They attribute this to the formation of a protective film on the anode surface which forms adequately after these two cycles even in the absence of additives in the electrolyte. The additives are described as beneficial for the filming process on the anode but the benefit is limited to just the first two cycles of the lithium intercalated carbon anode and electrolyte. The lithium salt used in this work, lithium perchlorate, is one of the poorer choices for secondary lithium cells with good cycle life and safety due to its reactivity and instability. Besenhard, et al., conclude on page 419 in this article that "in the case of metallic lithium electrodes however, the considerable electrochemical reactivity of all of these additives may be a serious drawback."

Other soluble additives to the electrolyte element of solid lithium anode/non-aqueous electrolyte/cathode type secondary cells besides polysulfides have been described. These include carbon dioxide and other inorganic additives in the aforementioned article by Besenhard, et al., including references therein; acid anhydrides as described in U.S. Pat. No. 5,296,319 to Bito, et al., to reduce or eliminate the presence of water; an unidentified reaction product of carbon disulfide and lithium, possibly a soluble sulfide, in the aforementioned U.S. Pat. No. 3,532,543; and high concentrations of water in U.S. Pat. Nos. 5,432,425 and 5,436,549 to Lundquist, et al. These additives often have disadvantages in that they are only effective for the first few cycles of cell use or they are not effective when the cathode material is sulfur-based. Also, they often are not compatible with the preferred solvents, lithium salts, and other materials of the non-aqueous electrolyte element of a lithium secondary cell.

It would therefore be advantageous to be able to utilize a material useful in the non-aqueous electrolyte element of a lithium secondary cell which exhibits beneficial effects on cycle life and safety during the first cycles of the charge-discharge cycles of the cell and maintains its beneficial effects during the useful life of the cell and which can be incorporated easily and reliably into the cell without significant extra cost.

It is therefore an object of the present invention to provide a soluble additive to the non-aqueous electrolyte which is suitable for use in manufacturing secondary lithium cells and which can be conveniently added to the electrolyte at the same time that one or more other additives to the electrolyte are added.

Another object of the present invention is to provide a means to identify such a soluble additive and to determine the range of amounts of its beneficial use in the non-aqueous electrolyte.

It is another object of the present invention to provide such a soluble electrolyte additive and non-aqueous electrolyte that is useful with both lithium metal and lithium ion anodes for secondary battery cells.

Yet another object of the present invention is to provide such a soluble electrolyte additive and non-aqueous electrolyte which is suitable to increase the cycle life and safety of secondary lithium cells.

It is another object of the present invention to provide such a soluble electrolyte additive and non-aqueous electrolyte which is present and useful in the initial discharge-charge cycles of the secondary lithium cells.

Still another object of the present invention is to provide secondary lithium cells which maintain the amounts of such a soluble electrolyte additive within the desired range in the non-aqueous electrolyte during the useful cycle life of the cells and which prevent excessive amounts of cathode reduction discharge products from diffusing into the electrolyte.

Another object of the present invention is to provide such a soluble electrolyte additive that is compatible with all the other materials of the secondary lithium cell that are in contact with the additive and which helps to control the reactivity of the other materials of the electrolyte with the lithium anode and with the other materials of the cell that are in contact with the electrolyte.

Yet another object of the present invention is to provide such a soluble electrolyte additive and non-aqueous electrolyte which is useful with secondary lithium cells which utilize elemental sulfur, organosulfur, or carbon-sulfur polymer compositions as a cathode active material.

Still another object of the present invention is to provide a process for preparing a non-aqueous electrolyte suitable for use in producing lithium metal and lithium ion secondary cells, which have increased cycle life and safety.

These and other objects of the present invention will become apparent upon a review of the following specification and the claims appended thereto.

SUMMARY OF THE INVENTION

In accordance with the foregoing objectives, there is provided by the present invention a non-aqueous electrolyte element with one or more lithium salts dissolved in one or more solvents which further contains a soluble electrolyte additive that is present in an effective amount that increases the lithium stripping efficiency at the anode-electrolyte interface compared to the lithium stripping efficiency when none of said soluble electrolyte additive is present. Such an electrolyte composition is, in general, useful as a novel electrolyte in the preparation of both lithium metal and lithium ion secondary electrochemical cells. In a preferred embodiment, the soluble electrolyte additive is a lithium polysulfide or water, where the water is added to obtain a total concentration of water of greater than 100 ppm in the electrolyte. In another preferred embodiment, the soluble electrolyte additive is a combination of a lithium polysulfide and water, where the water is added to obtain a total concentration of water of greater than 100 ppm in the electrolyte.

It is most preferred that the non-aqueous electrolyte of the present invention exists in a secondary lithium metal cell with a cathode containing elemental sulfur, organosulfur, or carbon-sulfur polymer compositions as a cathode active material. In a particularly preferred embodiment, the soluble electrolyte additive is a combination of a lithium polysulfide and water, where the water is added to obtain a total concentration of water of greater than 100 ppm in the electrolyte, the anode is lithium metal, and the cathode contains an elemental sulfur, organosulfur, or carbon-sulfur polymer composition as a cathode active material.

A process for the production of such an electrolyte element and the manufacture of secondary lithium cells utilizing the novel electrolyte is also provided herewith.

DETAILED DESCRIPTION OF THE INVENTION

The novel electrolyte composition of the present invention comprises a solution of one or more lithium salts, and of a soluble electrolyte additive, which is present in an effective amount that increases the lithium stripping efficiency at the anode-electrolyte interface compared to the lithium stripping efficiency when none of such a soluble additive is present, dissolved or otherwise solubilized in one or more electrolyte solvents.

By "lithium stripping efficiency" is meant the per cent of the lithium which is stripped or oxidized from the anode on full discharge compared to the amount of lithium freshly deposited and available for stripping averaged for at least the initial five cycles of lithium deposition and lithium stripping. Any deviation in this percentage from 100 per cent represents lithium which has been lost in terms of useful availability for the charge/discharge performance of the cell.

This loss of lithium during the cycle of deposition (charge) and stripping (discharge) has serious disadvantages for the performance of the cell, particularly for cycle life and safety. It is believed that some of the lithium which is lost is involved in a complex number of side reactions with materials of the electrolyte to form various side products which are mainly on the surface of the anode or in the electrolyte. These side products may physically interfere, such as in a barrier film on the anode, or chemically interfere, such as reacting further with freshly deposited lithium, with desirable barrier or stabilization films on the lithium surface, or with materials in the electrolyte, thereby negatively impacting the desired charge/discharge electrochemistry of the cell. Ultimately, the increasing presence of these side products results in such a decrease in the energy capacity of the cell that the cycle life is shortened below its acceptable level, typically greater than 300 cycles at or above the rated capacity at 80 per cent depth of discharge.

In terms of safety, the loss of lithium that is typical with secondary lithium cells contributes to the practice of using at least a three to five fold excess of lithium in the cell beyond the amount needed for the anode assuming 100 per cent efficiency of lithium deposition and stripping throughout the useful life of the cell. This greatly adds to the safety issues with lithium due to the much greater amount of lithium present. Also, the loss of lithium, particularly at high levels, is believed to be associated with the formation of an increasingly highly porous lithium surface, including very fine growths or dendrites protruding above the surface of the anode. Besides being undesirable for the continuing capacity and cycle life of the cell, this physical form of lithium is believed to be more reactive with materials, such as the electrolyte element, such that under abusive conditions, such as a high temperature excursion, it causes the cell to be more susceptible to fire, venting, explosion, or other unsafe result from reaction of the lithium material. Also, the dendrites can become large enough to contact the cathode and cause a shorting of the cell which could lead to a high temperature excursion in addition to the failure of the cell.

It is evident from the disadvantages associated with the loss of lithium that it is particularly important to minimize the loss of lithium from the initial cycles of charge/ discharge. Otherwise, the various side products associated with the loss of lithium begin a progressive series of additional side reactions and physical transformations which shorten cycle life and develop less safe conditions.

Although many solvents and lithium salts, and combinations thereof, have been proposed for use in secondary lithium cells, their specific interaction with the lithium anode, particularly by the combination of one or more solvents and one or more lithium salts, needs to be carefully evaluated for reactivity, especially for undesirable side reactions which will shorten cycle life and contribute to unsafe conditions. This evaluation is best done by a variety of techniques, including analyzing the electrolyte and lithium surface for chemical and physical degradation over time and over the operating range of temperature of the cell, building test cells and then measuring cycle life and analyzing for the formation of degradation products during cycling, and measuring the lithium stripping efficiency. From this overall evaluation, most of the combinations of solvents and lithium salts, as is, are found to be too reactive for practical use in secondary lithium cells. The remaining combinations are less reactive with the lithium in a detrimental way, but they still have disadvantages, particularly for cycle life. The lithium stripping efficiency of these remaining preferred combinations, which have shown good resistance to the formation of chemical and physical degradation products with the lithium anode, including in cell cycle testing, is high, and provides a relative value which is in general correlation with the cycling efficiency of a bulk lithium electrode in the same electrolyte. For example, a lithium stripping efficiency of 80 per cent for one specific electrolyte may correlate to a cycling efficiency of 96 per cent for a bulk lithium electrode in the same electrolyte. With this same electrolyte solvent and salt combination, if the lithium stripping efficiency increases above 80 per cent, the cycling efficiency would increase above 96 per cent. Conversely, if the lithium stripping efficiency in this case decreases below 80 per cent, the cycling efficiency would decrease below 96 per cent.

Surprisingly, it has been found that certain concentrations of certain soluble materials can be added to the combination of one or more solvents and one or more lithium salts to produce an increase in lithium stripping efficiency compared to the value when none of the soluble electrolyte additive is present. The concentrations with the increased lithium stripping efficiency are typically in a relatively narrow range which is unique for each particular combination of solvents and lithium salts. Also, typically, this range of increased lithium stripping efficiency is some intermediate concentration, such as 0.05M to 0.20M, where both lower and higher concentrations result in a lower lithium stripping efficiency. In particular, excessive amounts of the soluble electrolyte additive can result in greatly reduced lithium stripping efficiency.

Preferred soluble electrolyte additives are those which increase the lithium stripping efficiency to a level greater than 80 per cent. Particularly preferred are those soluble electrolyte additives which increase the lithium stripping efficiency to a level greater than 95 per cent.

The secondary lithium cells for use with the novel electrolyte of the present invention include both metallic lithium and lithium-ion type anodes. Suitable metallic lithium anodes include lithium and alloys of lithium such as lithium-tin, lithium-aluminum, lithium-silicon, and lithium-sodium. Suitable lithium-ion anodes include lithium intercalated carbons and lithium intercalated graphites. Preferred are metallic lithium anodes and lithium intercalated carbon anodes. Particularly preferred are metallic lithium anodes and lithium intercalated carbon anodes which have an anode stabilization layer on the surface of the anode in contact with the electrolyte wherein the anode stabilization layer effectively reduces the reactivity of the anode with the electrolyte and also reduces the formation of dendrites and highly porous areas on the anode surface, as described heretofore. Suitable anode stabilization layers include those described in U.S. patent application Ser. No. 08/618,111 by applicant and U.S. Pat. No. 5,434,021 by Fauteux, et al., the disclosures of both of which are totally incorporated herein by reference.

It is believed that the soluble electrolyte additives in the range of concentrations that provide an increased lithium stripping efficiency form a very thin protective or passivation film on the lithium anode surface. This protective film reduces the undesired side reactions of the lithium anode with the electrolyte and improves the quality of the lithium deposition, such as preventing dendrites and the formation of a highly porous surface, without decreasing the electrochemical efficiency of the lithium anode and the cell. At excessive concentrations of such additives, it is believed that the protective films can be degraded or destroyed by reaction with the excess additive. At insufficient concentrations of such additives, it is believed that the protective films are not formed, are too thin to be effective, or are of a different composition which decreases the lithium stripping efficiency.

A preferred electrolyte additive is a soluble lithium polysulfide. A particularly preferred electrolyte additive is lithium octasulfide ($Li_2S_8$).

Another preferred electrolyte additive is water when present in a range of concentrations of water of greater than 100 ppm in the electrolyte. In the case of water, since it is always present at some very low concentration in the electrolyte because it is not practical to remove it entirely, the lithium stripping efficiency of the electrolyte without the effective amount of soluble electrolyte additive must be measured first on the range of water typically present in the electrolyte when trying to keep it as anhydrous as possible during the production of the secondary lithium cell. Even with efficient drying of the solvents and lithium salts prior to incorporation in the electrolyte combined with production of the electrolyte element and the cell in dry room conditions where the relative humidity is under 1 per cent, the electrolyte will typically have at least 10 ppm of water and often as much as 40 ppm of water. Accordingly, in the practice of the present invention, the lithium stripping efficiency of each combination of solvents and lithium salts is determined over the range of water concentrations from 5 ppm to 100 ppm. The highest lithium stripping efficiency from this range up to 100 ppm is then used as the base line to determine whether any addition of water to a total water level of greater than 100 ppm increases the lithium stripping efficiency for that particular combination of solvents and lithium salts. The ranges of water providing increased lithium stripping efficiency over the baseline level vary according to the particular combination of solvents and lithium salts, as is found with the other additives such as lithium polysulfide, and are typically ranges such as 100 to 150 ppm and 400 to 500 ppm.

Another particularly preferred electrolyte additive is a combination of water and a soluble lithium polysulfide where the effective amount of water to increase the lithium stripping efficiency is first determined, as described heretofore. Then, using the lithium stripping efficiency with the most effective amount of water present as the base line for comparison, the range of effective amount of added lithium polysulfide to further increase the lithium stripping efficiency is determined. On this basis, the range of effective amounts of both water and lithium polysulfide in combination as the soluble electrolyte additive is established.

Other suitable additives for the novel electrolyte of the present invention can be identified using the method, as described heretofore, of determining the range of concentrations of soluble additive that increases the lithium stripping efficiency. Depending on the particular cathode active material, the various reduction products of the cathode which are soluble in the electrolyte, are each candidates for evaluation as such a electrolyte additive. Although most of these reduction products would be expected to be detrimental to the electrolyte and the lithium anode, it is expected that some will be suitable additives to increase cycle life and safety when they are present in the electrolyte in the range of the effective amounts that increases the lithium stripping efficiency over the level when no such additive is present. For example, as described herein, lithium polysulfides, and most particularly, lithium octasulfide, which are soluble reduction products of cathodes containing either elemental sulfur or carbon-sulfur polymer compositions as cathode active materials, are preferred additives for the novel electrolytes of the present invention.

Although these soluble cathode reduction products, such as inorganic polysulfides in the case of sulfur-based cathodes, are formed during discharge and can diffuse into the electrolyte and build up to a concentration that is within the range of effective amounts of additive that increases the lithium stripping efficiency, it is preferred to incorporate an effective amount of the additive into the electrolyte before initial discharge and to have a means to maintain the amount of the additive within its effective range, as first determined as providing increased lithium stripping efficiency, during the full discharge/charge cycle life of the cell. As described heretofore, this prevents undesirable side reactions and reduces lithium anode and electrolyte degradation during the initial discharge/charge cycles of the cell when less than an effective amount of the soluble additive is yet present.

Also, a means to limit the amount of the additive from exceeding the range of effective amounts that was found to increase lithium stripping efficiency is preferred to prevent excessive amounts of additive from degrading the cycle life and safety of the cell, as described heretofore. Suitable means to prevent excessive concentrations of the electrolyte additive of the present invention where said additive is also a soluble reduction product of the cathode active material, include selecting electrolyte solvents and other components of the electrolyte, such as the lithium salt, to limit the solubility of the additive; adding a cathode stabilization layer between the cathode and electrolyte element which blocks or greatly inhibits the passage of the soluble reduction product from the cathode into the electrolyte; incorporating a material into the cathode which effectively encapsulates or entraps the cathode active material and its soluble reduction product and prevents or retards its diffusion into the electrolyte; and modifying the cathode active material to form fewer or no soluble reduction products. These means are also suitable for preventing undesirable concentrations of soluble cathode reduction products, which are not the electrolyte additive of the present invention, from diffusing into the electrolyte and causing a reduction in cycle life, safety, and other key properties of the electrolyte and cell. Preferred means are adding a cathode stabilization layer or incorporating an effective encapsulating material into the composite cathode. Particularly preferred is using the means of adding a cathode stabilization layer together with an effective encapsulating material in the composite cathode to maintain the soluble electrolyte additive of the present invention in its effective range of concentration and also to prevent the undesirable increase in concentration of the variety of soluble cathode reduction products by means of their diffusion into the electrolyte element.

The electrolyte element of the present invention can be a liquid, solid, or gel electrolyte as long as at least one nonaqueous electrolyte solvent and at least one lithium salt are present in the electrolyte element. Suitable electrolyte solvents include any of those commonly used with secondary lithium metal and lithium-ion cells as described in the various references by applicant cited herein. Preferred is a combination of 1,3-dioxolane and tetraglyme in a 1:1 ratio by weight as the electrolyte solvent. Suitable lithium salts include any of those commonly used with secondary lithium metal and lithium-ion cells as described in the various references by applicant cited herein. Preferred lithium salts include lithium triflate and lithium imide. Particularly preferred is a combination of 1,3-dioxalane and tetraglyme as the electrolyte solvent with lithium imide as the lithium salt in a liquid electrolyte.

Suitable liquid electrolyte elements are the suitable electrolyte solvents and lithium salts with any one of the commonly used porous separators as described in the various references by applicant cited herein. Preferred is a porous polyolefin or ceramic separator with a combination of 1,3-dioxolane and tetraglyme in a 1:1 ratio by weight and with lithium imide or lithium triflate as the lithium salt.

Suitable solid electrolyte elements are the suitable electrolyte solvents and lithium salts with any one of the commonly used ionically conductive solid polymers as described in the various references by applicant cited herein. Preferred is a polyethylene oxide or polyether solid polymer with a combination of 1,3-dioxolane and tetraglyme in a 1:1 ratio by weight and with lithium imide or lithium triflate as the lithium salt.

Suitable gel electrolyte elements are the suitable electrolyte solvents and lithium salt with any one of the commonly used ionically conductive gel polymers as described in the various references by applicant cited herein. Preferred is a polyether gel polymer with a combination of 1,3-dioxolane and tetraglyme in a 1:1 ratio by weight and with lithium imide or lithium triflate as the lithium salt.

The secondary lithium cell of the present invention comprises a metallic lithium or lithium ion anode, a cathode, and an electrolyte element intermediate between the anode and cathode. A preferred cell includes a metallic lithium anode, a cathode containing an elemental sulfur, organosulfur, or carbon-sulfur polymer composition as a cathode active material, and a liquid electrolyte. A particularly preferred cell includes a metallic lithium anode, a cathode containing an elemental sulfur or carbon-sulfur polymer composition as a cathode active material, and a liquid electrolyte containing an effective amount of a lithium polysulfide that increases the lithium stripping efficiency of the electrolyte.

The exact amount of the soluble electrolyte additive of the present invention to add to the electrolyte is selected from the range of effective amounts that increase lithium stripping efficiency and is determined by experiments measuring the cycle life, safety, and other key performance properties of secondary lithium cells built using various effective amounts of the additive. Due to the many complex reactions and interactions in the electrolyte and cell, including the influx of soluble cathode reduction products into the electrolyte, it is impossible to select the optimal initial effective amount of the soluble electrolyte additive of the present invention without such empirical testing. However, in general, it is preferred to be in the middle third of the range of effective amounts of the additive that increases lithium stripping efficiency. It is particularly preferred to use an effective amount of the additive that provided the highest lithium stripping efficiency.

The novel electrolyte of the present invention is prepared by adding the above identified ingredients, all having an acceptable purity and water content, i.e., one or more electrolyte solvents; one or more lithium salts; and an effective amount of such electrolyte additive, and mixing them by any conventional means, preferably at room temperature, to form a homogeneous solution. This electrolyte solution is then combined with the other materials of the electrolyte element by any of the means commonly employed to produce the particular type of electrolyte element, i.e., liquid, solid, or gel electrolyte.

The novel secondary lithium cell with the electrolyte of the present invention is prepared by combining the electrolyte element with the anode, cathode, and other elements of the cell using any of the means commonly employed to produce the particular type of lithium cell, i.e., metallic lithium or lithium-ion anodes; liquid, solid, or gel electrolytes; elemental sulfur, organosulfur, carbon-sulfur polymer, transition metal chalcogenide including oxides, or other cathodes.

In the process of this invention, it is preferred to determine the suitability and range of amounts of the soluble electrolyte additive in the novel electrolyte and cell of this invention by finding those effective amounts of such additive where the lithium stripping efficiency at the anode-electrolyte interface is increased compared to the value with no soluble additive present. It is particularly preferred to determine the specific effective amount of such an additive to use by further determining the cycle life, safety, and other key properties of the cells produced by incorporating amounts of the additive selected from across the range of effective amounts that increase the lithium stripping efficiency and to utilize the particular effective amount that provides the best overall results for subsequent cell production.

The invention will now be more fully explained by the following examples. However, the scope of the invention is not intended to be limited to these examples.

EXAMPLES

Example 1

Lithium plating/stripping efficiency, or more simply lithium stripping efficiency as it has been referred to heretofore, was measured in a three electrode electrochemical cell with lithium counter electrode (foil, 2 cm$^2$), lithium reference (foil, 0.5 cm$^2$) and nickel microdisk working electrode ($4 \times 10^{-3}$ cm$^2$). Nickel was selected as a metal stable to formation of lithium alloys. The cell was filled with 3–4 ml of mixed TEGDME/1M lithium imide electrolyte, containing 7 ppm of water. SI 1287 Electrochemical Interface equipment controlled by CorrWare 1.4 software was used for electrochemical measurements. The nickel working electrode was pretreated at 0.5V vs. Li for 30 seconds, then the electrode was polarized to −0.2V and kept at this potential to reach the specified lithium deposition charge ($Q_p$). After $Q_p$ reached a value of 0.5 coulombs (C)/cm$^2$, the electrode was polarized positively (0.3V), and the lithium dissolution charge ($Q_s$) was measured. The experiment was repeated five times with a fresh electrode each time to obtain an average measured charge. The lithium plating/stripping efficiency (E), determined as $E = Q_s/Q_p \times 100\%$, was calculated to be 23%. TEGDME: 1,3-dioxolane (1:1) electrolyte with 1 M lithium imide salt, containing 30 ppm of water, was tested with the same experimental setup and method. Lithium plating/stripping efficiency of 40% was measured.

The same experiment was performed with TEGDME: 1,3-dioxolane (1:1) electrolyte containing 1M lithium triflate salt and 14 ppm of water. Lithium plating/stripping efficiency of 23% was determined.

Example 2

Figure 1:
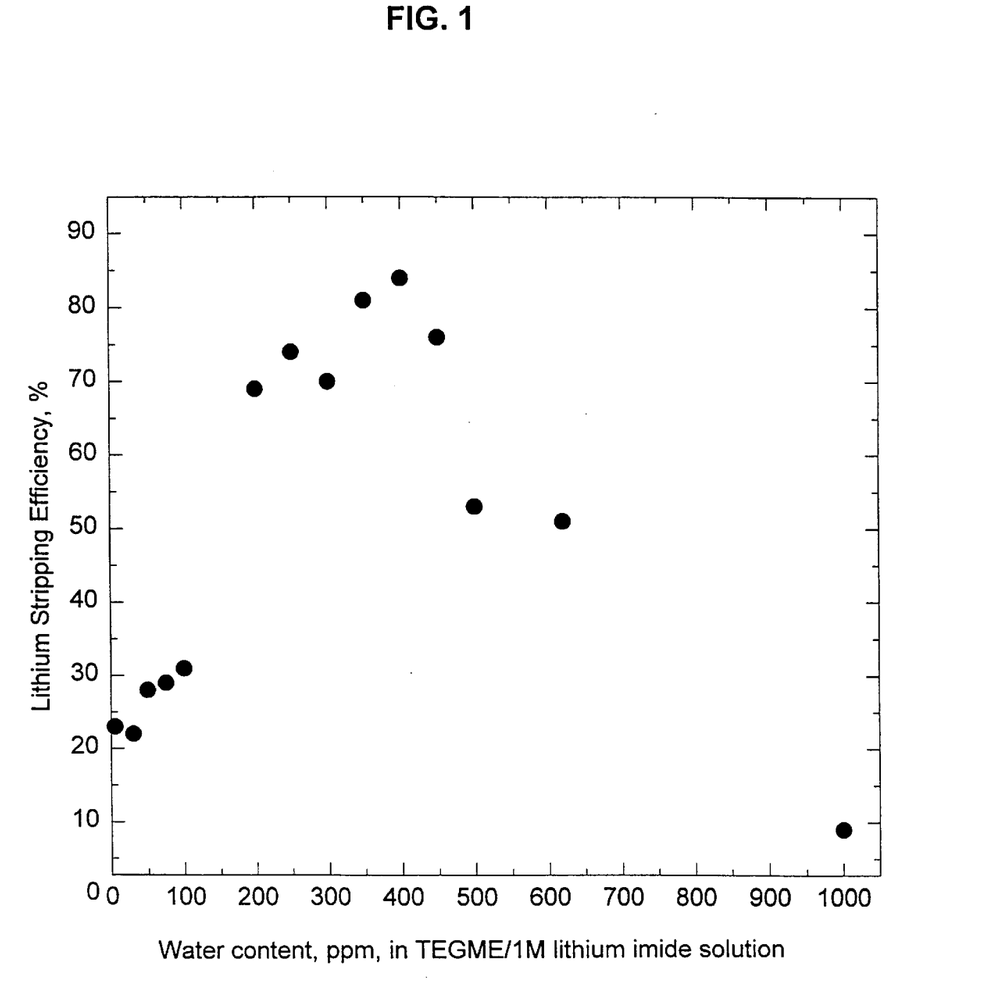
FIG. 1 shows the lithium stripping efficiency for a tetraglyme (TEGDME)/1M lithium perfluoromethane sulfonimide (lithium imide) electrolyte solution at varying levels of water present from 7 ppm to 1000 ppm.

The water level in TEGDME/1M lithium imide electrolyte was varied from 7 to 1000 ppm by portionwise addition of a stock water solution in the same electrolyte. All solutions were stirred at least 1 hour before measurements. The lithium plating/stripping efficiency was found to decrease at 50 ppm of water and then to increase until passing through a maximum at 350 to 400 ppm of water, as shown in FIG. 1.

Example 3

Figure 2:
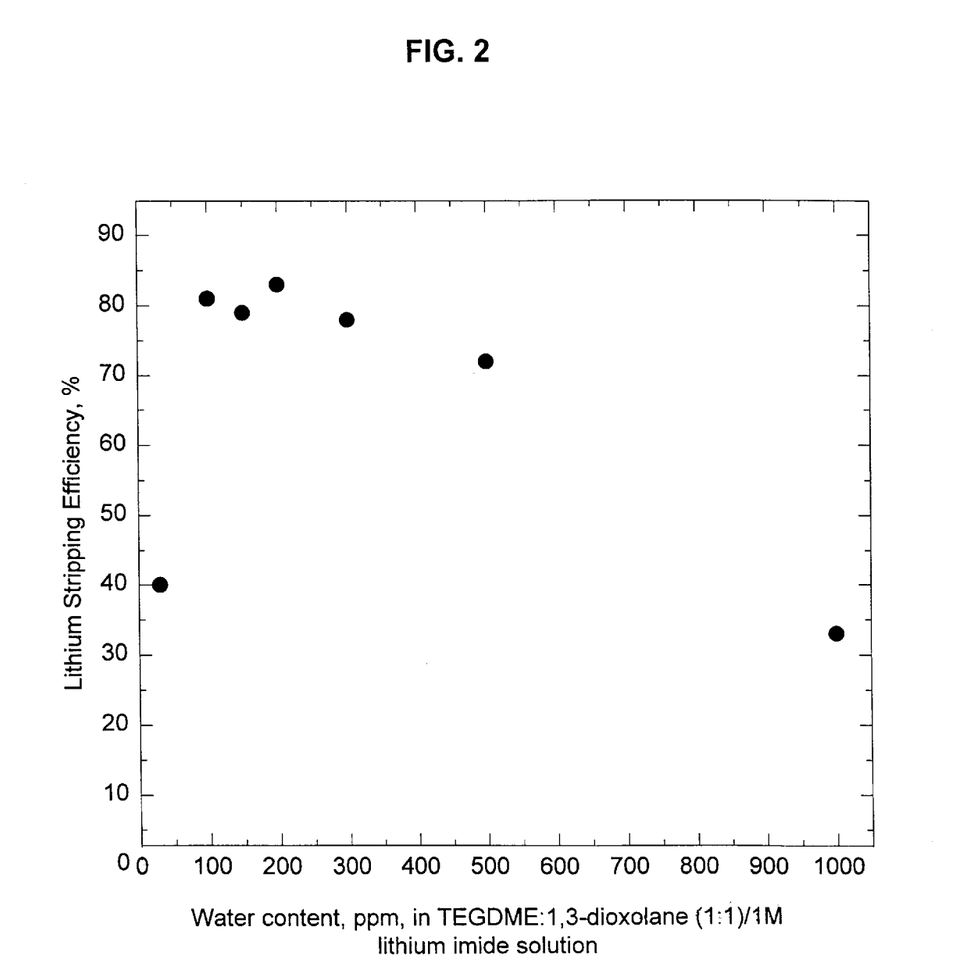
FIG. 2 shows the lithium stripping efficiency for a TEGDME: 1,3-dioxolane (1:1)/1 M lithium imide electrolyte solution at varying levels of water present from 30 ppm to 1000 ppm.

The water level in TEGDME:1,3-dioxolane (1:1) electrolyte containing 1M lithium imide was varied in the same manner as in Example 2. Water content between 100 and 300 ppm was found to be optimal for lithium stripping efficiency, as shown in FIG. 2.

Example 4

The water level in TEGDME:1,3-dioxolane (1:1)/1M lithium triflate electrolyte was adjusted to 100 ppm of water by adding a calculated amount of stock solution, containing 2000 ppm of water. Using the same procedure as in Examples 1 to 3, the lithium plating/stripping efficiency was found to be 50%, as compared to 23% for 14 ppm of water.

Example 5

Figure 3:
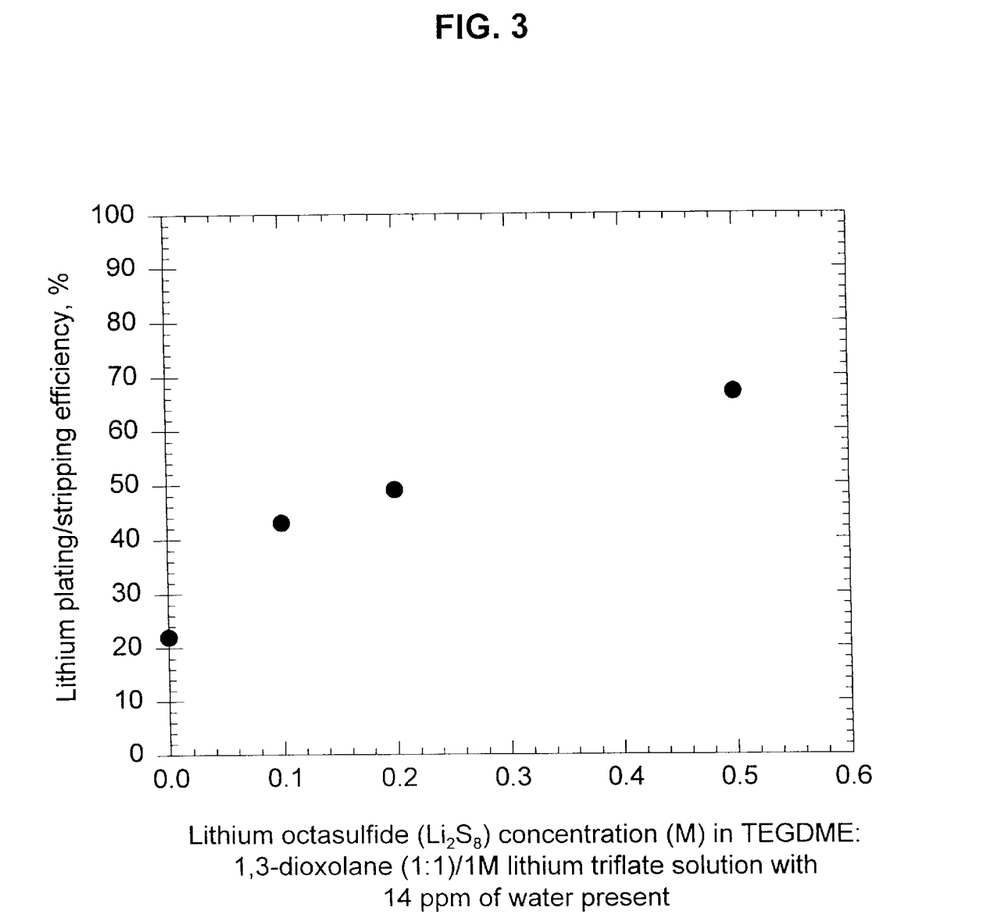
FIG. 3 shows the lithium stripping efficiency for a TEGDME: 1,3-dioxolane (1:1)/1M lithium perfluoromethane sulfonate (lithium triflate) electrolyte solution at varying concentrations of lithium octasulfide present from 0 to 0.5M and with a water level of 14 ppm.

A 0.5M solution of lithium octasulfide was prepared by overnight stirring at 80C of a sulfur-lithium sulfide mixture (7:1 molar ratio) dispersed in TEGDME: 1,3-dioxolane (1:1)/1M lithium triflate electrolyte, containing 14 ppm of water. The resulting dark-brown solution was used as a stock solution to prepare electrolytes containing specified concentrations of lithium octasulfide. The same experimental setup and method as described in Example 1 was used to measure the lithium plating/striping efficiency. The results are presented in FIG. 3. Lithium octasulfide at 0.1, 0.2, and 0.5M concentrations increased the lithium stripping efficiency over the value with no lithium octasulfide present.

Example 6

Figure 4:
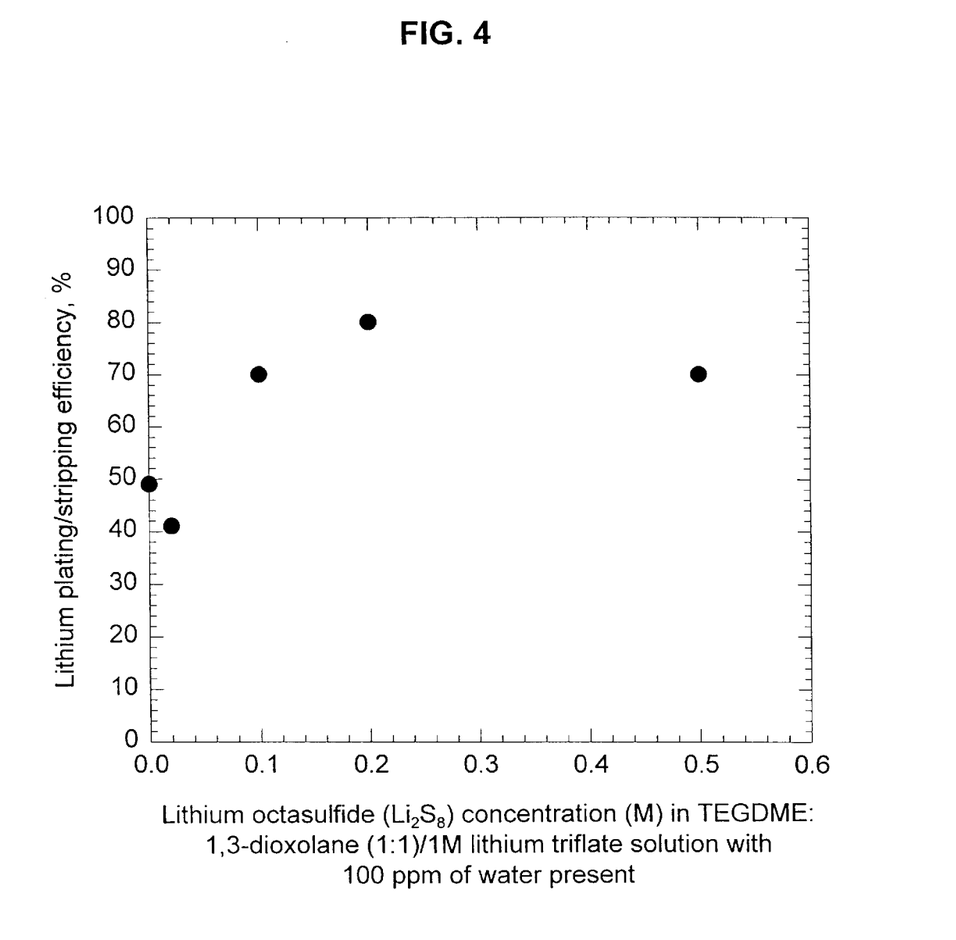
FIG. 4 shows the lithium stripping efficiency for a TEGDME: 1,3-dioxolane (1:1)/1M lithium triflate electrolyte solution at varying concentrations of lithium octasulfide present from 0 to 0.5M and with a water level of 100 ppm.

A 0.5M solution of lithium octasulfide in TEGDME: 1,3-dioxolane (1:1) electrolyte containing 100 ppm of water was prepared in a similar way to Example 5 and used to prepare more diluted solutions. Using the same procedure as in Example 1 and as shown in FIG. 4, an initial decrease in lithium plating/stripping efficiency at 0.02M of lithium octasulfide was found to change to a significant increase at 0.1M and 0.2M. 0.5M of lithium octasulfide showed a decrease in lithium stripping efficiency from the 0.2M level.

Example 7

Figure 5:
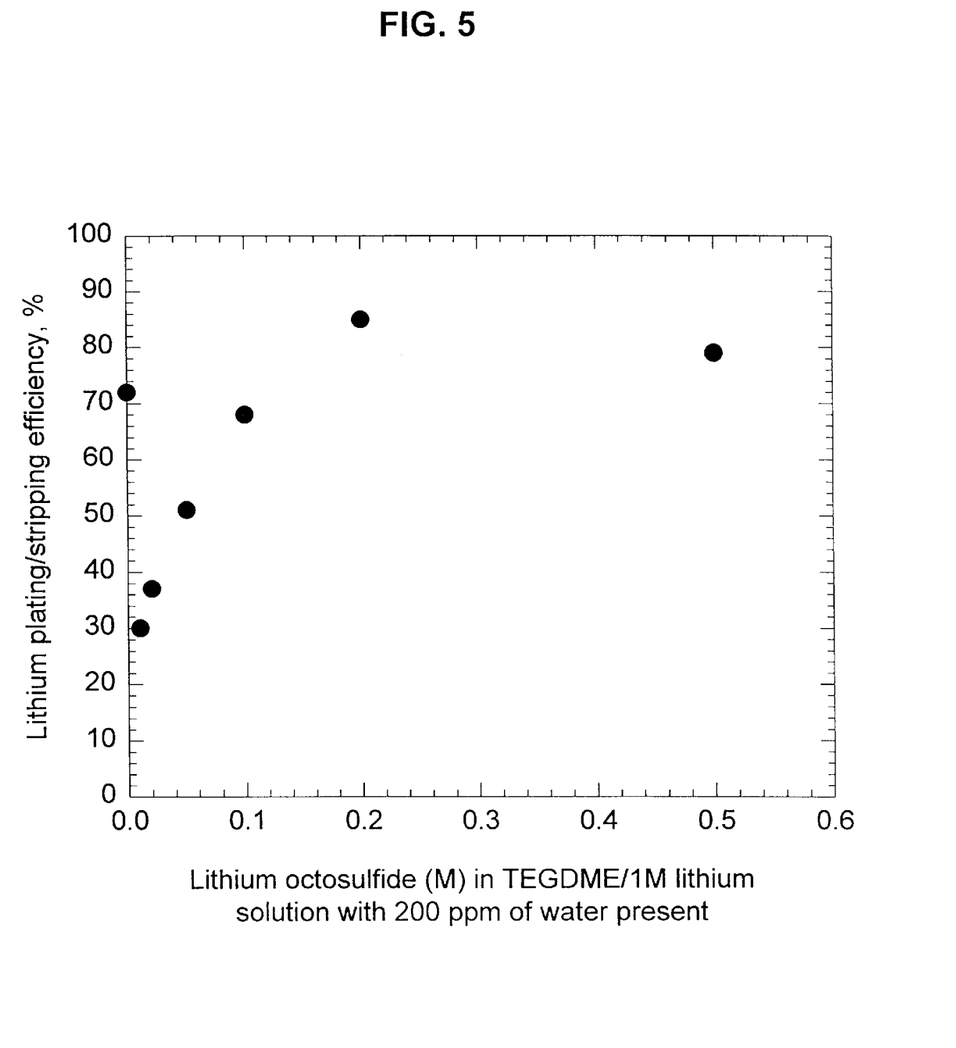
FIG. 5 shows the lithium stripping efficiency for a TEGDME/1M lithium imide electrolyte solution at varying concentrations of lithium octasulfide present from 0 to 0.5M and with a water level of 200 ppm.

The concentration of lithium octasulfide in TEGDME/1M lithium imide solutions, containing 200 ppm of water, was stepwise increased from 0 to 0.55M. Using the same procedures as in Example 1, lithium plating/stripping efficiency was found to initially decrease and then to go through a maximum at about 0.2M before starting to decrease again, as shown in FIG. 5.

Example 8

The lithium plating/stripping efficiency, measured as described in Example 1, should reflect contributions of lithium loss due to consumption by the electrolyte (coulombic efficiency), lithium encapsulation due to imperfect deposition, and the corrosion process in the lithium-nickel corrosion pair. The current densities for plating/stripping at selected potentials were much higher (5–10 mA/cm$^2$) than in standard lithium cells (1 mA/cm$^2$), to facilitate the nucleation process and growth of the lithium layer. As a result, the measured plating/stripping efficiency or lithium stripping efficiency, using the experimental techniques and definitions herein, will be lower than the cycling efficiency of a bulk lithium electrode in the same electrolyte. To test the relation between lithium stripping efficiency and cycling efficiency, an electrochemical cell with three lithium electrodes and 5 ml of TEGDME: 1,3-dioxolane (1:1) electrolyte with 100 ppm of water and 0.2M of lithium octasulfide was assembled. The weight of the working lithium electrode (8.5 mg) corresponded to an initial charge ($Q_{in}$) of 117.3 C. After 30 plating/stripping cycles at 1 mA/cm$^2$ (1.8 C in each direction), the residual amount of lithium ($Q_f$=50.5 C) was dissolved at a constant potential of 0.4V. The cycling efficiency was determined as $E = (Q_s - Q_{ex}/n)/Q_s \times 100\%$, where $Q_s$ is the total stripping charge, $Q_{ex}$ is the excess charge of lithium electrode, and n is the number of cycles.

In our conditions, $Q_s=n\times 1.8$ C, $Q_{ex}=Q_{in}-Q_p$, and the cycling efficiency was equal to 95.9%. This compares to the lithium stripping efficiency of 80% for the same electrolyte in Example 6, as shown in FIG. 4.

Example 9

Figure 6:
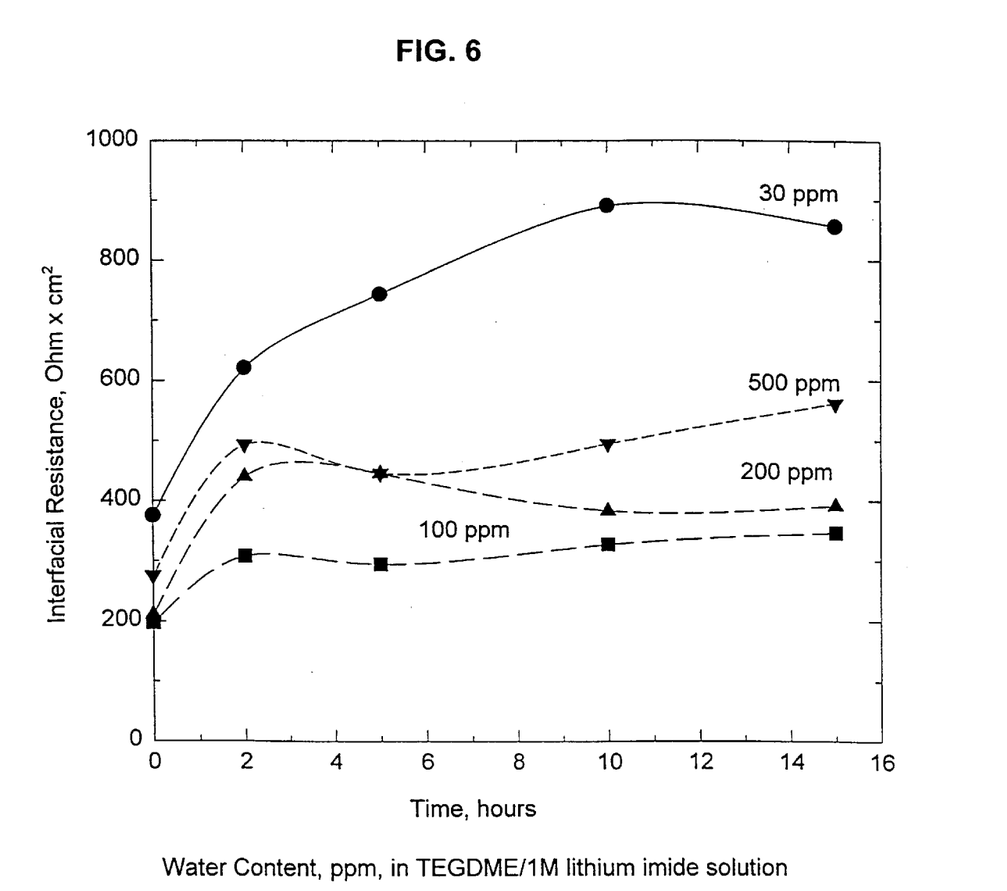
FIG. 6 shows the interfacial resistance at different times in hours for a lithium electrode in a TEGDME/1M lithium imide electrolyte solution at varying levels of water present from 30 ppm to 500 ppm.

It is believed that the results in Examples 1 to 4 can be explained by the formation of more favorable conditions for developing a passivation layer at the lithium surface, probably composed mostly of lithium hydroxide. This layer should be capable of readily transmitting lithium ions, while preventing penetration of the electrolyte. To test this concept, interfacial resistance ($R_i$) of a lithium electrode immersed in TEGDME/1M lithium imide electrolyte, containing 30, 100, 200, and 500 ppm of water, was determined by electrochemical impedance spectroscopy (EIS) in symmetrical cells with two lithium electrodes. The time evolution of the EIS spectra upon storage at room temperature was monitored. In support of this concept of forming a passivation layer, rapid increase of $R_i$ for the 30 ppm solution was observed within 10 hours, whereas solutions containing 100 and 200 ppm of water, which showed increased lithium stripping efficiency compared to 30 ppm of water, demonstrated much lower and more stable $R_i$, as shown in FIG. 6.

While the invention has been described in detail and with reference to specific embodiments thereof, it will be apparent to one skilled in the art that various changes and modifications can be made without departing from the spirit and scope thereof.

What is claimed is:

1. A nonaqueous electrolyte composition for use in a secondary lithium battery cell comprising:
   (i) one or more solvents;
   (ii) one or more soluble lithium salts other than a lithium polysulfide;
   (iii) greater than 100 ppm and less than 1000 ppm of water; and,
   (iv) an effective lithium stripping enhancing amount of one or more soluble lithium polysulfides that increases the lithium stripping efficiency at the anode-electrolyte interface compared to said lithium stripping efficiency with none of said soluble lithium polysulfides present.

2. The electrolyte composition of claim 1, wherein said electrolyte composition is selected from the group consisting of liquid electrolyte compositions, solid electrolyte compositions, and gel electrolyte compositions.

3. The electrolyte composition of claim 2, wherein said electrolyte composition is a liquid electrolyte composition.

4. The electrolyte composition of claim 1, wherein said electrolyte composition comprises greater than 100 ppm and less than 600 ppm of water.

5. The electrolyte composition according to any one of claims 1, 2, 3, or 4, wherein one of said one or more soluble lithium polysulfides is lithium octasulfide.

6. The electrolyte composition according to claim 1, wherein said electrolyte composition comprises one or more soluble lithium polysulfides at a concentration from 0.05M to 0.5M.

7. The electrolyte composition according to claim 1, wherein said electrolyte composition comprises one or more soluble lithium polysulfides at a concentration from 0.05 M to the solubility limit of said lithium polysulfides in said solvents.

8. A secondary lithium battery cell comprising:
   (i) a cathode;
   (ii) an anode comprising lithium; and
   (iii) a nonaqueous electrolyte composition comprising:
      (a) one or more solvents;
      (b) one or more lithium salts other than a lithium polysulfide;
      (c) greater than 100 ppm and less than 1000 ppm of water; and,
      (d) an effective lithium stripping enhancing amount of one or more soluble lithium polysulfides that increases the lithium stripping efficiency at the anode-electrolyte interface compared to said lithium stripping efficiency with none of said soluble lithium polysulfides present, thereby effecting the improved cycling life and safety of the cell, wherein said amount of one or more soluble lithium polysulfides is present in an initial state of said electrolyte composition when said cell is in its fully charged state and before initial discharge.

9. The cell of claim 8, wherein said cell has means to maintain said effective lithium stripping enhancing amount of one or more soluble lithium polysulfides in said electrolyte composition during the charge-discharge operation and the storage of the cell.

10. The cell of claim 8, wherein said cathode comprises elemental sulfur as a cathode active material.

11. The cell of claim 8, wherein said cathode comprises an organosulfur composition as a cathode active material.

12. The cell of claim 8, wherein said cathode comprises a carbon-sulfur polymer composition as a cathode active material.

13. The cell of claim 8, wherein said anode is selected from the group consisting of lithium metal, lithium-tin alloys, lithium-aluminum alloys, lithium-silicon alloys, lithium intercalated carbons, and lithium intercalated graphites.

14. The cell of claim 8, wherein said electrolyte composition is selected from the group consisting of liquid electrolyte compositions, solid electrolyte compositions, and gel electrolyte compositions.

15. The cell of claim 14, wherein said electrolyte composition is a liquid electrolyte composition.

16. The cell according to claim 8, wherein said electrolyte composition comprises greater than 100 ppm and less than 600 ppm of water.

17. The cell according to any one of claims 8, 9, 10, 11, 12, 13, 14, 15 or 16, wherein one of said one or more soluble lithium polysulfides is lithium octasulfide.

18. The cell according to any one of claims 8, 10, 11, or 12, wherein said cell further comprises an anode stabilization layer between said anode and said electrolyte composition, wherein said anode stabilization layer increases the lithium stripping efficiency compared to said lithium stripping efficiency with no anode stabilization layer present.

19. The cell according to any one of claims 8, 10, 11, or 12, wherein said cell further comprises:
   a cathode stabilization layer between said cathode and said electrolyte composition; or
   a cathode composition comprising said cathode and one or more encapsulating materials;
   wherein said cathode stabilization layer or said cathode composition effectively retards the transport of soluble reduction products from said cathode into said electrolyte composition.

20. The cell according to claim 8, wherein said electrolyte composition comprises one or more soluble lithium polysulfides at a concentration from 0.05 M to 0.5 M.

21. The cell according to claim 8, wherein said electrolyte composition comprises one or more soluble lithium polysulfides at a concentration from 0.05 M to the solubility limit of said lithium polysulfides in said solvents.

22. A process for preparing a nonaqueous electrolyte composition useful in secondary lithium battery cells, comprising the steps of:
(i) preparing a solution of one or more solvents; one or more soluble lithium salts other than a lithium polysulfide; greater than 100 ppm and less than 1000 ppm of water; and an effective lithium stripping enhancing amount of one or more soluble lithium polysulfides that increases the lithium stripping efficiency at the anode-electrolyte interface compared to said lithium stripping efficiency with none of said soluble lithium polysulfides present; and, optionally,
(ii) combining said solution with other electrolyte materials selected from the group consisting of: ionically conductive solid polymers and ionically conductive gel polymers.

23. The process of claim 22, wherein said electrolyte composition comprises greater than 100 ppm and less than 600 ppm of water.

24. The process according to claim 22 or 23, wherein one of said one or more soluble lithium polysulfides is lithium octasulfide.

25. The process according to claim 22, wherein said electrolyte composition comprises one or more soluble lithium polysulfides at a concentration from 0.05 M to 0.5 M.

26. The process according to claim 22, wherein said electrolyte composition comprises one or more soluble lithium polysulfides at a concentration from 0.05 M to the solubility limit of said lithium polysulfides in said solvents.

* * * * *